N. McLeod,
Straw Cutter.
No. 99,931.   Patented Feb. 15, 1870.
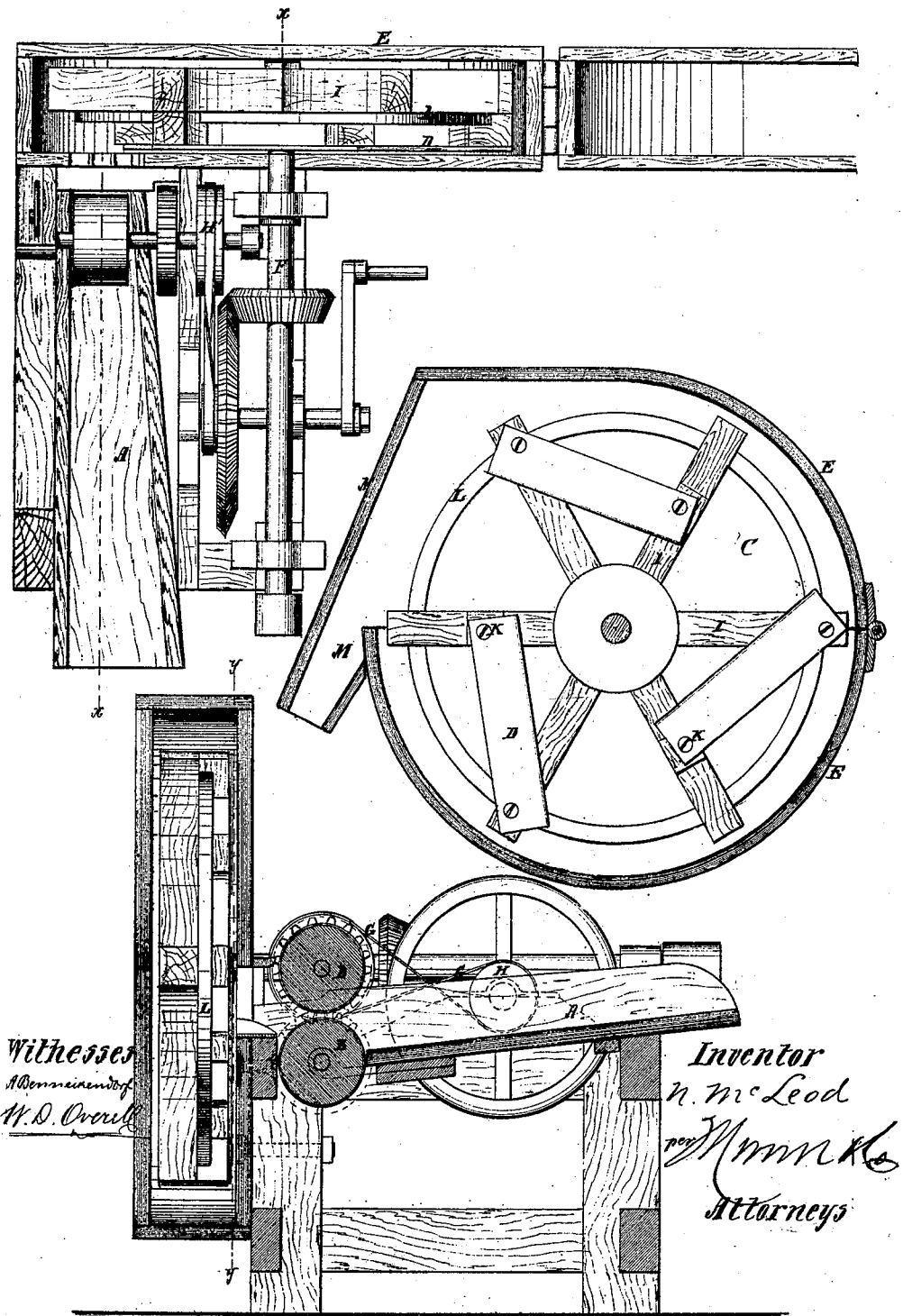
Witnesses
A. Bennierendorf
W. D. Overell
Inventor
N. McLeod
per Munn & Co
Attorneys

United States Patent Office.

NORMAN McLEOD, OF CLIO, SOUTH CAROLINA.

Letters Patent No. 99,931, dated February 15, 1870.

IMPROVEMENT IN FEED-CUTTER AND THRESHER.

The Schedule referred to in these Letters Patent and making part of the same

*To all whom it may concern:*

Be it known that I, NORMAN McLEOD, of Clio, in the District of Marlborough, and State of South Carolina, have invented a new and improved Feed-Cutter and Thresher; and I do hereby declare that the following is a full, clear, and exact description thereof, which will enable others skilled in the art to make and use the same, reference being had to the accompanying drawings forming part of this specification.

This invention relates to new and useful improvements in the machine for which a patent was granted to me November 10, 1868, No. 83,984, which said machine is designed for use either for straw or feed-cutting, and the improvement relates to the construction and mode of operation of the feed-rollers; also in the arrangement of the cutters and cutter-carrier, all as hereinafter specified.

Figure 1 represents a plan view of my improved machine, with the case of the cutter-carrier, which is in two parts and hinged together, opened;

Figure 2 represents a sectional elevation of the same, taken on the line $x\ x$ of fig. 1; and Figure 3 represents a section taken on the line $y\ y$.

Similar letters of reference indicate corresponding parts.

A represents the feeding trough, which is made detachable.

B, the feed-rollers;

C, the cutter-carrier;

D, the cutters; and

E, the case enclosing the cutters and carrier.

The said cutter-case is made detachable from the feeding frame, being designed more particularly for use in the open field to prevent the wind from blowing the cut stuff away.

In the said previous case the upper feed-roller is represented as provided with teeth to facilitate drawing in the straw, and both are operated by a ratchet-wheel upon the upper roller and a tappet on the driving shaft F.

The improvement in this case in the feed-rollers consists in coating them with emery mixed with red lead, and japan to make them rough, and in operating them by a belt, G, working over a pulley, H, on the crank-shaft and over a pulley, H', on the upper roller.

Instead of the right-angular projections or heels to the cutters, as shown in the said previous case for connecting the said cutters to the ends of the arms I, I now use plain cutters and fasten the rear ends considerably inward from the said ends of the arms as shown at K. to produce the shear cut, and these cutters I also secure so that they may be readily detached when the arms are to be used for beating out or threshing the grain, and on blocks projecting from the arms.

These arms in this case I provide with a heavy iron rim, L, to act as a balance wheel when cutting the straw and operating the machine by hand, and this I also connect detachably to the arms so that it may be readily removed when required.

Removing this rim and the cutters, I use this machine with great advantage for threshing and beating out the grain from the straw fed in in the same way as when cutting.

When cutting the cut material is discharged through the spout M, but this spout will not answer for discharging the broken straw and grain when threshing, and I have therefore in this case provided a detachable connection for the front part N of the said spout, whereby it may be readily removed.

Having thus described my invention,

I claim as new, and desire to secure by Letters Patent—

1. The feed-rollers B, provided with a roughened coating of emery, red lead, and japan, as herein described, and operated by the belt G and pulleys H H, substantially as specified.

2. The combination with the cutter or beater-arms I of the cutters D and balancing rim L, when constructed and detachably connected substantially as specified.

NORMAN McLEOD.

Witnesses:
J. H. LEE,
M. G. McKAY.